(12) United States Patent
Peltier et al.

(10) Patent No.: US 6,405,855 B1
(45) Date of Patent: Jun. 18, 2002

(54) CONVEYOR SYSTEM

(76) Inventors: Jeff Peltier, 21853 Broadwater Dr., Pelican Rapids, MN (US) 56572; Gregory L. Deal, 920-42nd Ave. North, Fargo, ND (US) 58102

( * ) Notice: Subject to any disclaimer, the term of this patent is extended or adjusted under 35 U.S.C. 154(b) by 0 days.

(21) Appl. No.: 09/939,925

(22) Filed: Aug. 24, 2001

Related U.S. Application Data

(63) Continuation-in-part of application No. 09/499,164, filed on Feb. 7, 2000.

(51) Int. Cl.⁷ .............................................. B65G 15/08
(52) U.S. Cl. ...................................... 198/819; 198/821
(58) Field of Search ................................ 198/819, 821, 198/847

(56) References Cited

U.S. PATENT DOCUMENTS

| | | | |
|---|---|---|---|
| 3,326,354 A | 6/1967 | Aydelott | 198/819 |
| 3,593,378 A | 7/1971 | Kamisaka | 425/78 |
| 4,565,285 A * | 1/1986 | Koistinen | 198/819 |
| 5,152,391 A | 10/1992 | Campbell | 198/550.01 |
| 5,246,102 A * | 9/1993 | Rappen et al. | 198/819 X |
| 5,511,652 A | 4/1996 | McGinnis | 198/819 |
| 6,170,646 B1 | 1/2001 | Kaeb et al. | 198/821 |

* cited by examiner

Primary Examiner—James R. Bidwell
(74) Attorney, Agent, or Firm—Michael S. Neustel

(57) ABSTRACT

A conveyor system for increasing the angle capabilities and allowing shorter lengths of a belt conveyor. The device includes a support frame, a tube attached to the support frame, a receiver support structure attached to the intake end of the tube, an endless belt positioned within the tube and about the receiver support structure, a plurality of paddle members attached to the outer surface of the endless belt, and a wind skirt attached to the lower portion of the tube. The plurality of paddle members include a plurality of V-shaped cutouts with a rounded narrow portion for allowing the endless belt to have a curved state or flat state. A foam member is positioned within the discharge end of the tube having guide slots for receiving the endless belt. The endless belt has a generally flat structure when positioned upon the receiver support structure and transitions to a curved structure when entering the tube.

20 Claims, 15 Drawing Sheets

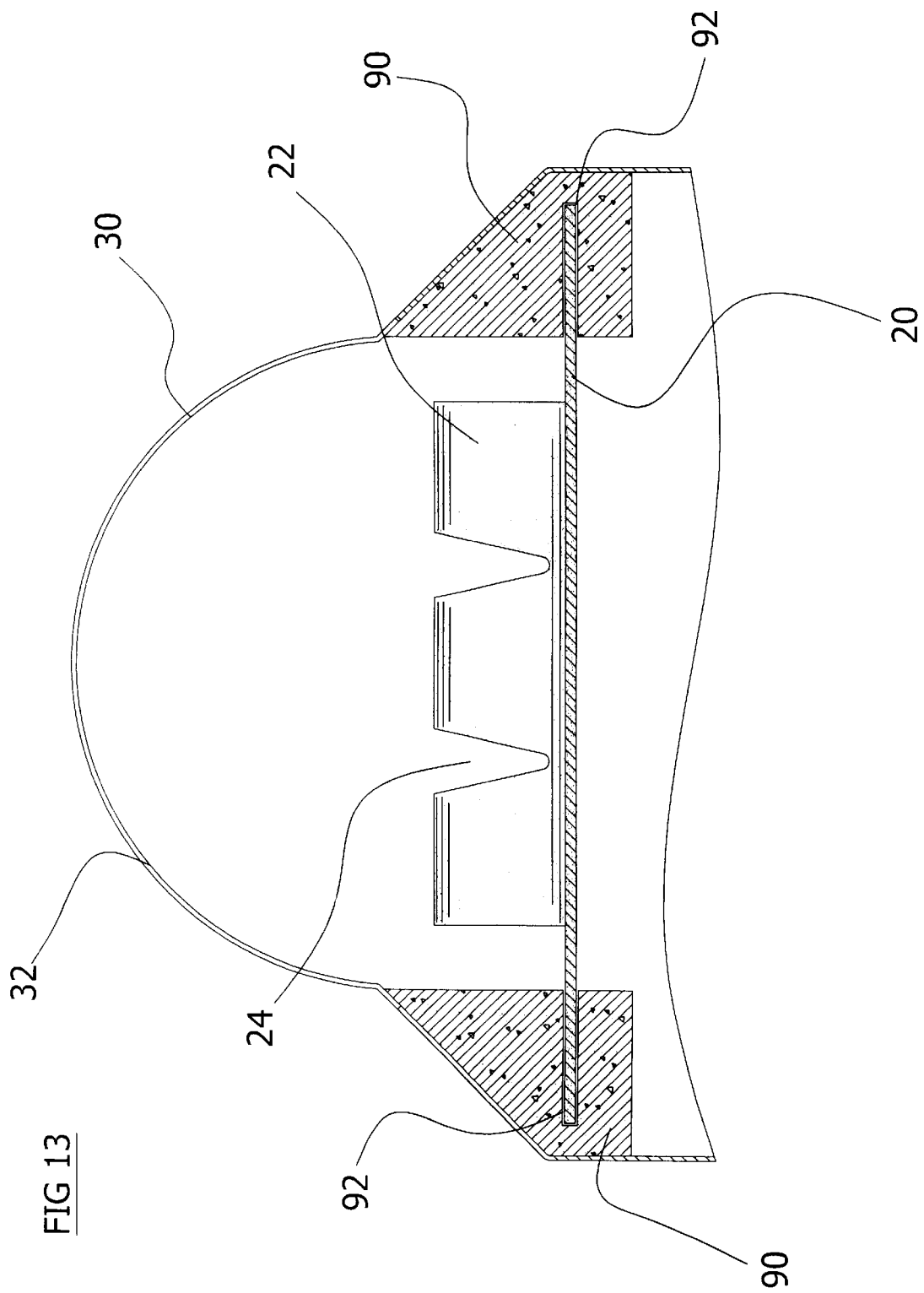

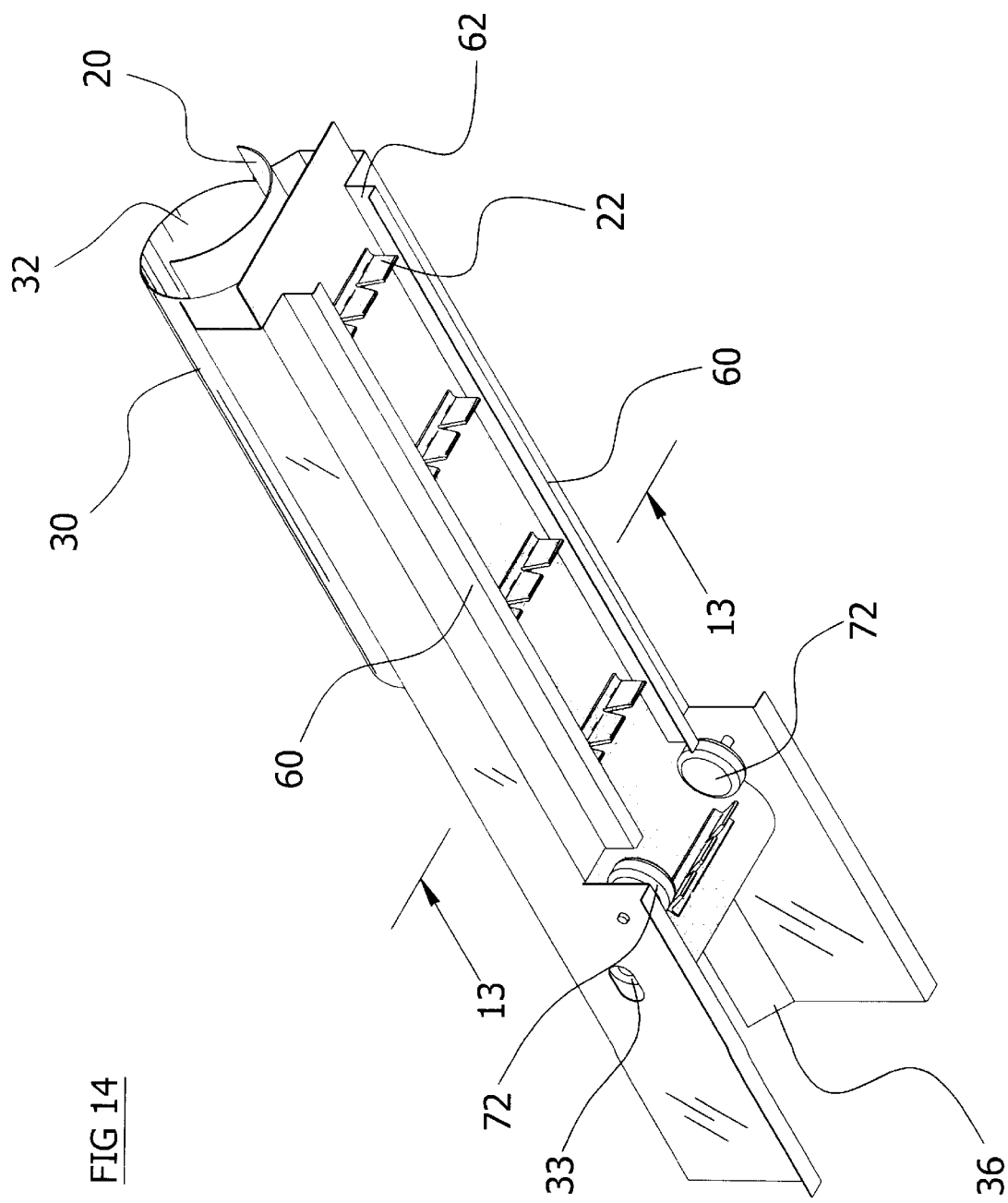

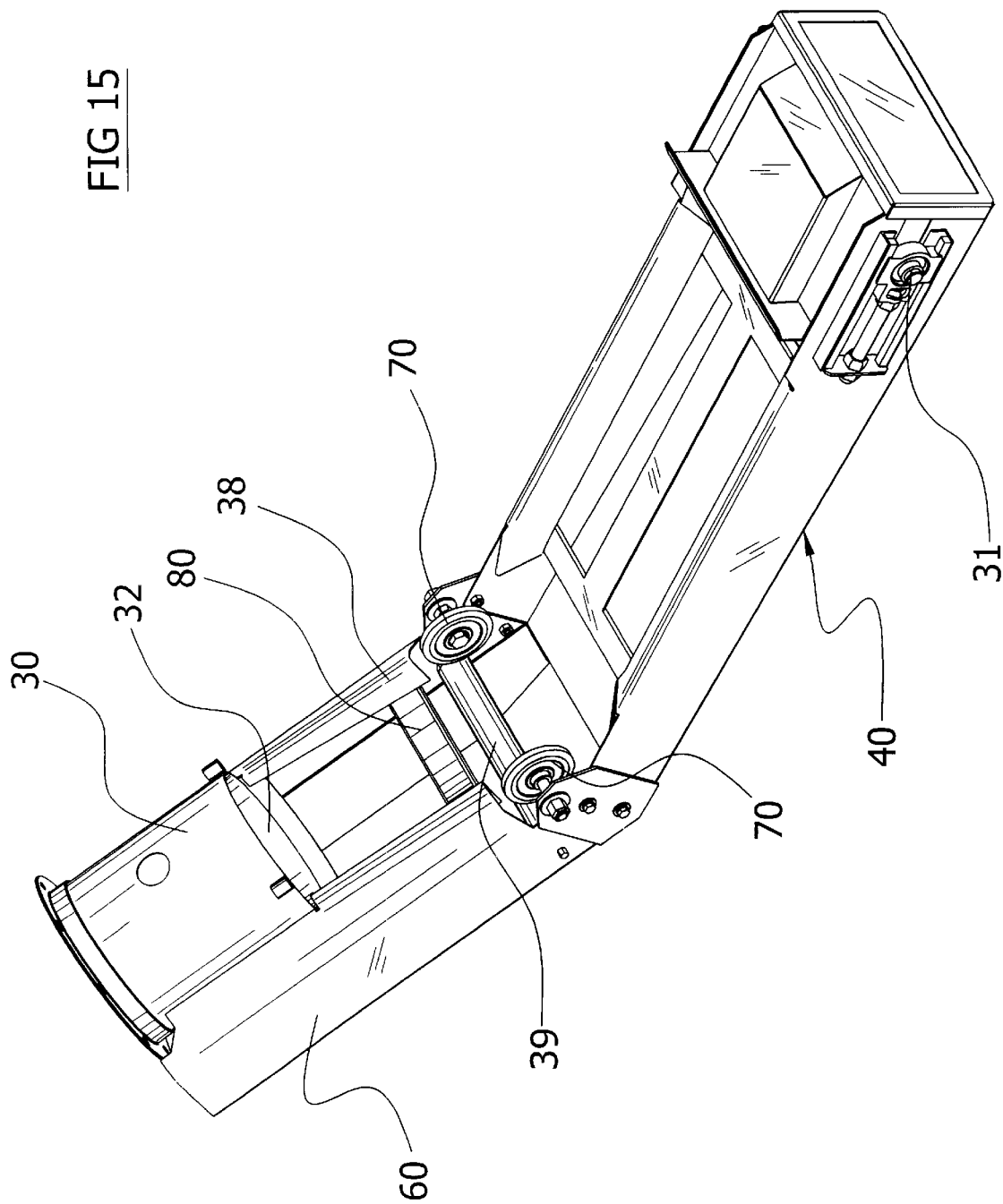

CONVEYOR SYSTEM

CROSS-REFERENCE TO RELATED U.S. PATENT APPLICATION

I hereby claim benefit under Title 35, United States Code, Section 120 of U.S. patent application Ser. No. 09/499,164 filed Feb., 7, 2000. This application is a continuation-in-part of the Ser. No. 09/499,164 application filed Feb. 7, 2000. The Ser. No. 09/499,164 application is currently pending. The Ser. No. 09/499,164 is incorporated by reference into this patent application.

BACKGROUND OF THE INVENTION

1. Field of the Invention

The present invention relates generally to belt conveyors and more specifically it relates to a conveyor system for increasing the angle capabilities and allowing shorter lengths of a belt conveyor.

2. Description of the Prior Art

Belt conveyors have been in use for years. Typically, a belt conveyor includes a tubular structure, a support structure for elevating the tubular structure at an angle, an endless belt positioned about the tubular structure, and a motor means for rotating the tubular structure. A conventional belt conveyor has an inlet for receiving the particulate material such as grain, fertilizer, sand, or gravel and an outlet for dispensing the particulate material. The endless track typically includes a plurality of ridges for engaging the particulate material. The tubular structure typically has a plurality of rollers that support the return portion of the endless belt. Conventional belt conveyors are generally utilized to elevate and transport particulate material from one location to another.

Conventional belt conveyors typically require a relatively flat angle to transport particulate material. If the angle of the conventional belt conveyor is too steep, then the particulate material falls slides downwardly and rearwardly toward the inlet of the conventional belt conveyor. Since the angle of a conventional belt conveyor is relatively small, the overall length of the conventional belt conveyor must be longer to elevate the particulate material to desired heights. In addition, because conventional belt conveyors are longer they require more room about a storage structure to load and unload particulate material.

Examples of patented conveyor devices include U.S. Pat. No. 6,170,646 to Kaeb et al.; U.S. Pat. No. 5,052,545 to Gongen; U.S. Pat. No. 3,326,354 to Aydelott; U.S. Pat. No. 5,511,652 to McGinnis; U.S. Pat. No. 5,152,391 to Campbell; U.S. Pat. No. 3,593,378 to Kamisaka which are all illustrative of such prior art.

The Kaeb et al. reference (U.S. Pat. No. 6,170,646) teaches a cleated belt adaptable to curvilinear shapes for transferring material through a curvilinear structure. However, Kaeb et al. does not teach the usage of a broadened cutouts between each of the cutouts to reduce debris collection between the paddle members. Furthermore, Kaeb et al. does not teach the endless belt having a flat lower portion transitioning into a curved upper structure.

Aydelott (U.S. Pat. No. 3,326,354) discloses a belt conveyor for conveying semi-fluid materials on a flexible belt. Aydelott teaches an apparatus for continuously shaping a belt into a tube, opening the tube-shaped belt, depositing semi-fluid materials within the belt, enclosing and lifting the materials, and opening the belt to release the materials.

McGinnis (U.S. Pat. No. 5,511,652) discloses a construction conveyor belt for moving powdery ash-like materials. McGinnis specifically teaches a conveyor belt construction including lateral edges which fold upwardly and inwardly upon the application of longitudinal directed tension.

While these devices may be suitable for the particular purpose to which they address, they are not as suitable for increasing the angle capabilities and allowing shorter lengths of a belt conveyor. Conventional belt conveyors require longer lengths and decreased angles to efficiently transport particulate material.

In these respects, the conveyor system according to the present invention substantially departs from the conventional concepts and designs of the prior art, and in so doing provides an apparatus primarily developed for the purpose of increasing the angle capabilities and allowing shorter lengths of a belt conveyor.

SUMMARY OF THE INVENTION

In view of the foregoing disadvantages inherent in the known types of belt conveyors now present in the prior art, the present invention provides a new conveyor system construction wherein the same can be utilized for increasing the angle capabilities and allowing shorter lengths of a belt conveyor.

The general purpose of the present invention, which will be described subsequently in greater detail, is to provide a new conveyor system that has many of the advantages of the belt conveyors mentioned heretofore and many novel features that result in a new conveyor system which is not anticipated, rendered obvious, suggested, or even implied by any of the prior art belt conveyors, either alone or in any combination thereof.

To attain this, the present invention generally comprises a support frame, a tube attached to the support frame, a receiver support structure attached to the intake end of the tube, an endless belt positioned within the tube and about the receiver support structure, a plurality of paddle members attached to the outer surface of the endless belt, and a wind skirt attached to the lower portion of the tube. The plurality of paddle members include a plurality of V-shaped cutouts with a rounded narrow portion for allowing the endless belt to have a curved state or flat state. A foam member is positioned within the discharge end of the tube having guide slots for receiving the endless belt. The endless belt has a generally flat structure when positioned upon the receiver support structure and transitions to a curved structure when entering the tube.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a conveyor system that will overcome the shortcomings of the prior art devices.

A second object is to provide a conveyor system for increasing the angle capabilities and allowing shorter lengths of a belt conveyor.

A further object is to provide a conveyor system that utilizes a flat lower portion for receiving the particulate material which then transitions into an upwardly angled curvilinear structure for increasing the volume of particulate material transported.

Another object is to provide a conveyor system that utilizes a plurality of cutouts between each of the paddle members to reduce collection of debris between the paddle members.

A further object is to provide a conveyor system that maintains a desired tension on the return portion of the endless belt.

Another object is to provide a conveyor system that provides for an effective transition from a curvilinear structure for the endless belt to a flat structure near the exit portion.

Another object is to provide a conveyor system that transports various types of particulate material.

An additional object is to provide a conveyor system that has a reduced overall length compared to a conventional belt conveyor.

A further object is to provide a conveyor system that can operate at a steeper angle than a conventional belt conveyor.

Another object is to provide a conveyor system that does not require idler rollers to support the return portion of the endless belt.

An additional object is to provide a conveyor system that is capable of utilizing tubular structures having various cross sectional areas such as circular or oval.

A further object is to provide a conveyor system that increases the conveying capacity of a belt conveyor.

Another object is to provide a conveyor system that requires less working room when in operation because of the reduced length.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 13 is a cross sectional view taken along line 13—13 of FIG. 14 illustrating the foam member with guide slots for receiving the side portions of the endless belt.

FIG. 14 is a lower perspective view of the upper end portion of the present invention illustrating the second roller and the tension rollers.

FIG. 15 is an upper perspective view of the lower portion of the present invention without the endless belt.

DESCRIPTION OF THE PREFERRED EMBODIMENT

Figure 1:
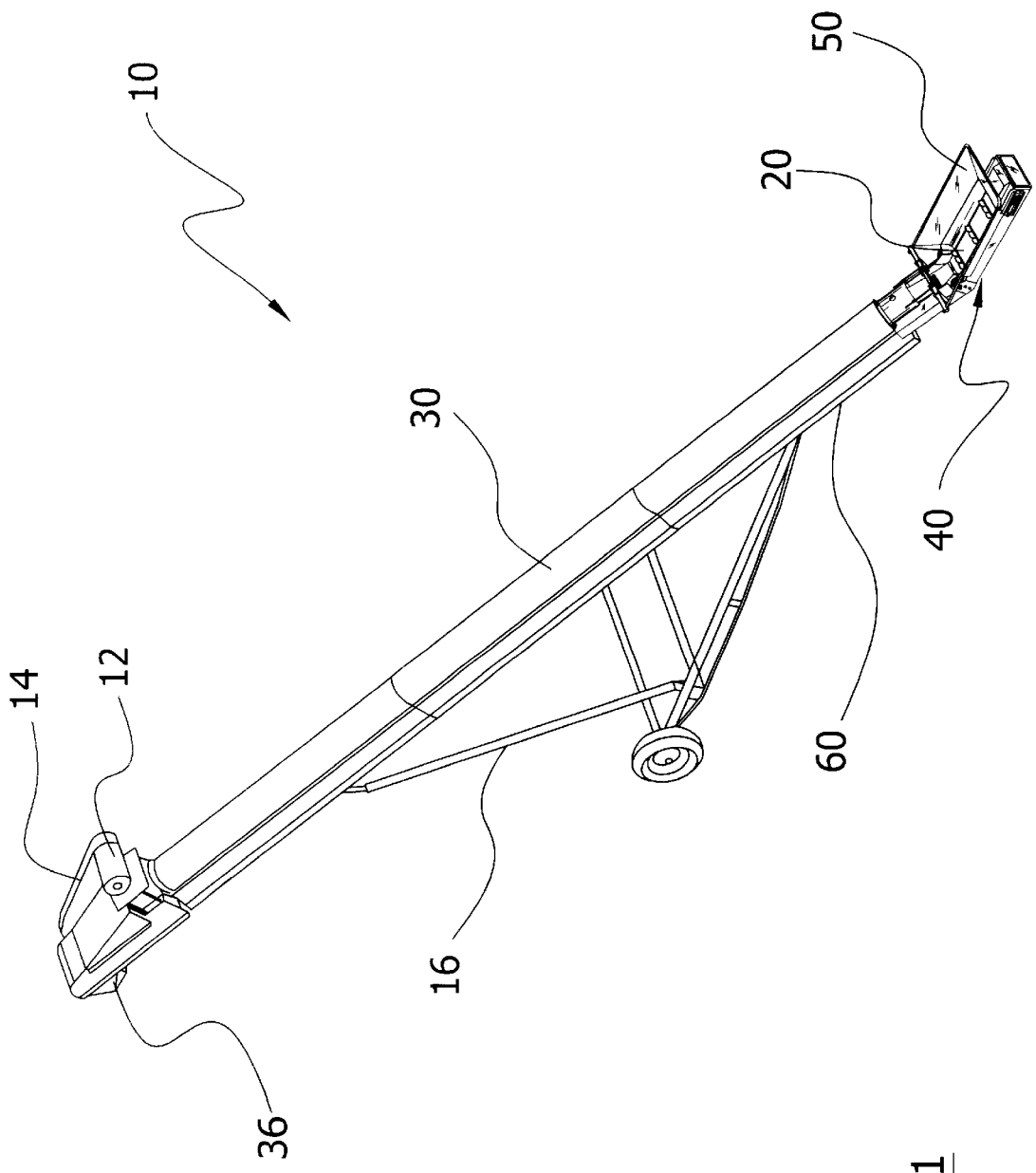
FIG. 1 is an upper perspective view of the present invention.

Turning now descriptively to the drawings, in which similar reference characters denote similar elements throughout the several views, FIGS. 1 through 16 illustrate a conveyor system 10, which comprises a support frame 16, a tube 30 attached to the support frame 16, a receiver support structure 40 attached to the intake end of the tube 30, an endless belt 20 positioned within the tube 30 and about the receiver support structure 40, a plurality of paddle members 22 attached to the outer surface of the endless belt 20, and a wind skirt 60 attached to the lower portion of the tube 30. The plurality of paddle members 22 include a plurality of V-shaped cutouts 24 with a rounded narrow portion for allowing the endless belt 20 to have a curved state or flat state. A foam member 90 is positioned within the discharge end 36 of the tube 30 having guide slots 92 for receiving the endless belt 20. The endless belt 20 has a generally flat structure when positioned upon the receiver support structure 40 and transitions to a curved structure when entering the tube 30.

A shown in FIG. 1 of the drawings, the elongate tube 30 is supported by the support frame 16. The support frame 16 may be comprised of any well-known structure commonly utilized for supporting a belt conveyor or auger. The support frame 16 preferably includes a plurality of wheels 22 for allowing mobility of the present invention, however it can be appreciated that stationary embodiments of the present invention may exist that do not utilize wheels 22. The support frame 16 also preferably includes a hitch for allowing transporting of the present invention from one location to another. It can be appreciated that a hitch is not required for the present invention and that various other embodiments of the support frame 16 may be utilized.

As shown in FIG. 1 of the drawings, the tube 30 is an elongate structure having a cylindrical shape thereto. The tube 30 may be comprised of one or more sections secured to one another as can be appreciated. The tube 30 may have any length and size as can be appreciated depending upon the use desired. As shown in FIGS. 9 through 14 of the drawings, the tube 30 includes a curvilinear lumen 32 for receiving and transporting the particulate material.

As shown in FIGS. 1 through 6 of the drawings, the tube 30 includes an intake end. As shown in FIG. 1 of the drawings, the tube 30 includes a discharge end 36 for dispersing the material transported within the tube 30. The intake end of the tube 30 receives the particulate material and the discharge end 36 dispenses the particulate material. A spout or other structure may be attached to the discharge end 36 as shown in FIG. 1 of the drawings.

Figure 8:
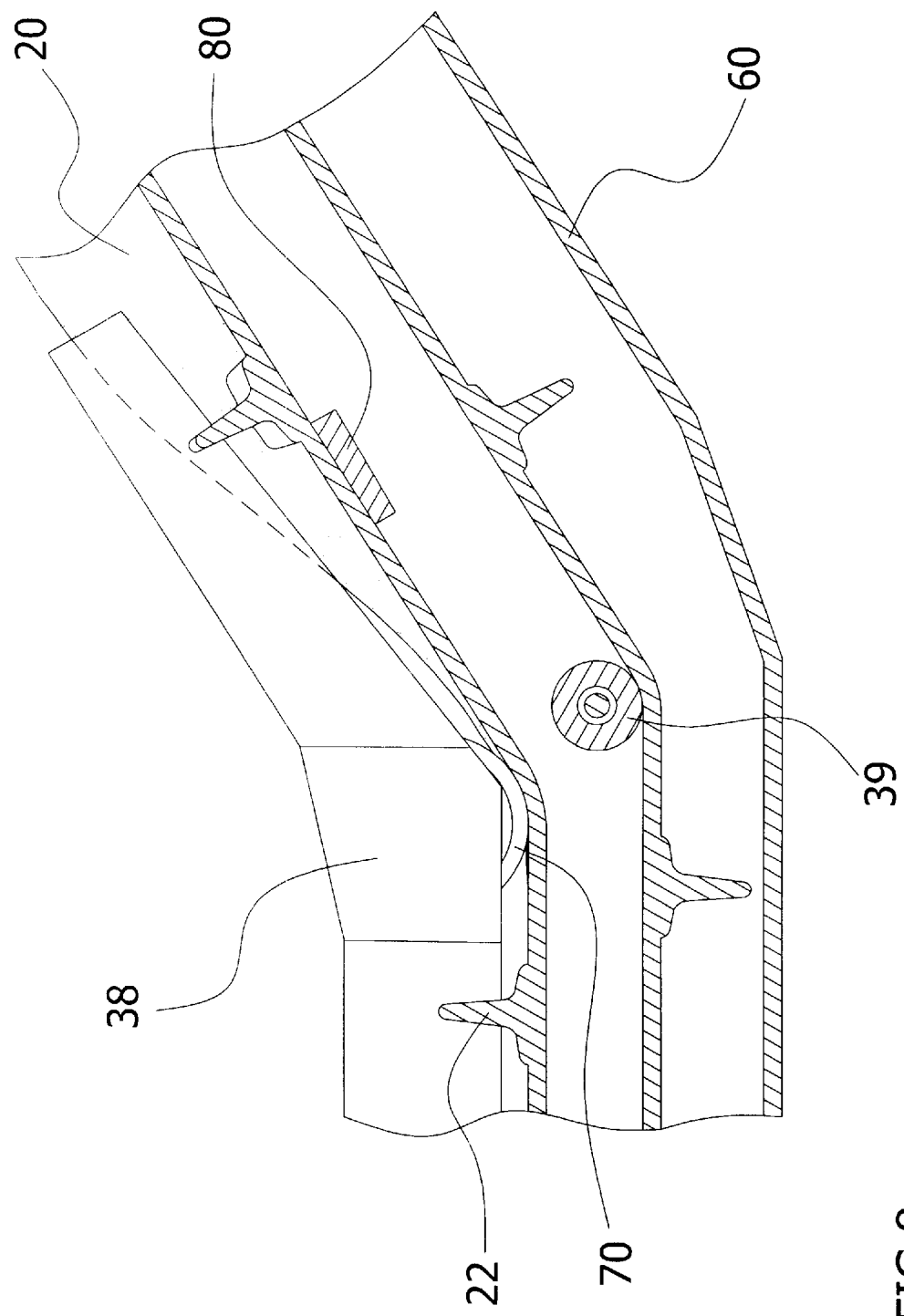
FIG. 8 is a side cutaway view of the transition portion.

As best shown in FIG. 8 of the drawings, the tube 30 preferably has a circular cross sectional area that is capable of slidably receiving the endless belt 20. It can be appreciated that the tube 30 may be comprised of various other cross sectional area shapes such as oval or oblique. The lower portion of the tube 30 may be comprised of various other shapes such as curved, U-shaped, or V-shaped for receiving and cupping the endless belt 20 during operation.

Figure 2:
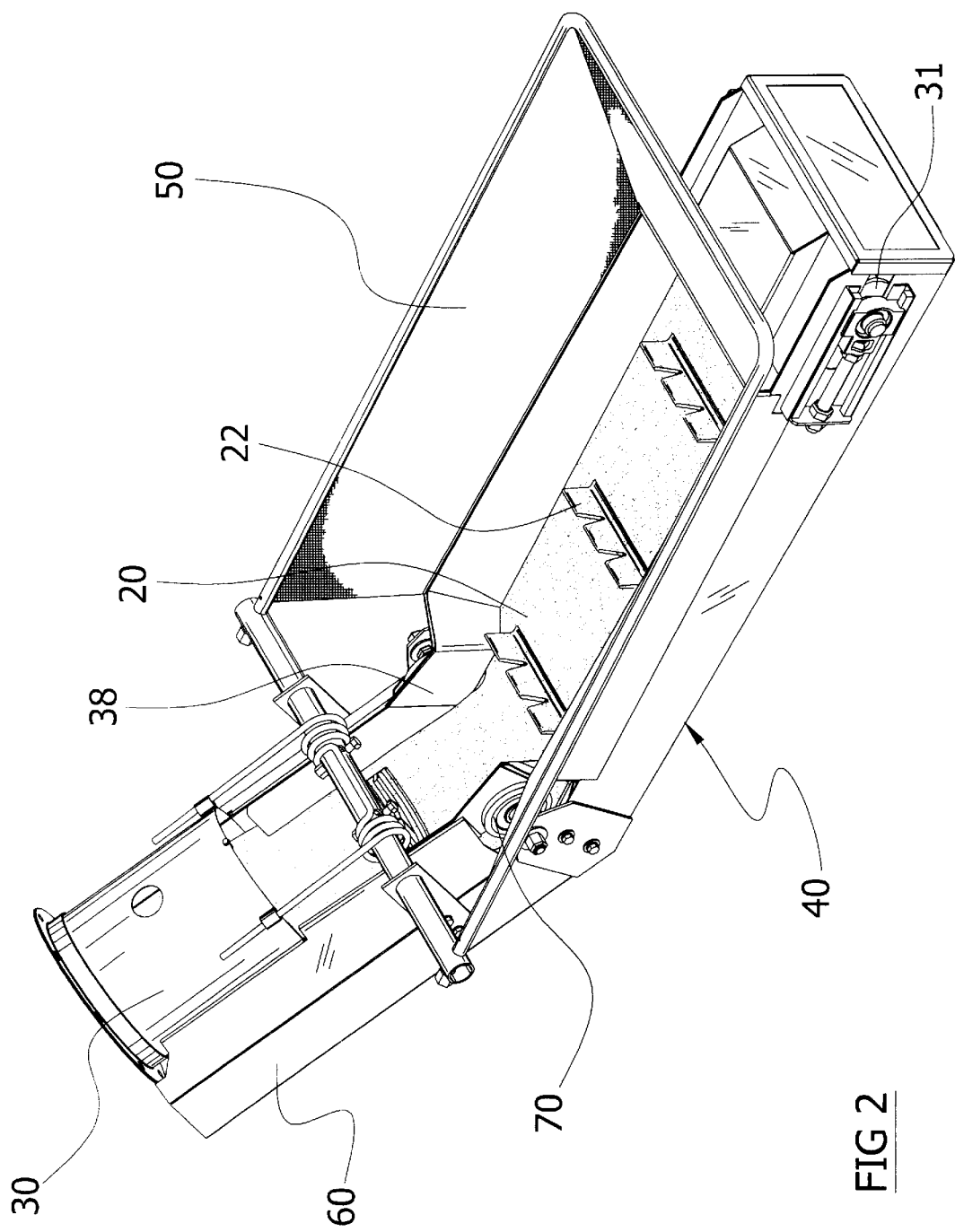
FIG. 2 is a magnified upper perspective view of the intake structure with a funnel attached thereto.

As shown in FIGS. 1 through 6 of the drawings, a receiver support structure 40 is attached to the intake end of the tube. The receiver support structure 40 may have various lengths, structures and shapes as can be appreciated. The receiver support structure 40 preferably has a flat inner surface for allowing the endless belt 20 to remain within a flat state as shown in FIGS. 2 and 15 of the drawings. A funnel 50 or other structure may be attached to the receiver support structure 40 to guide particulate material into the intake end during operation.

Figure 6:
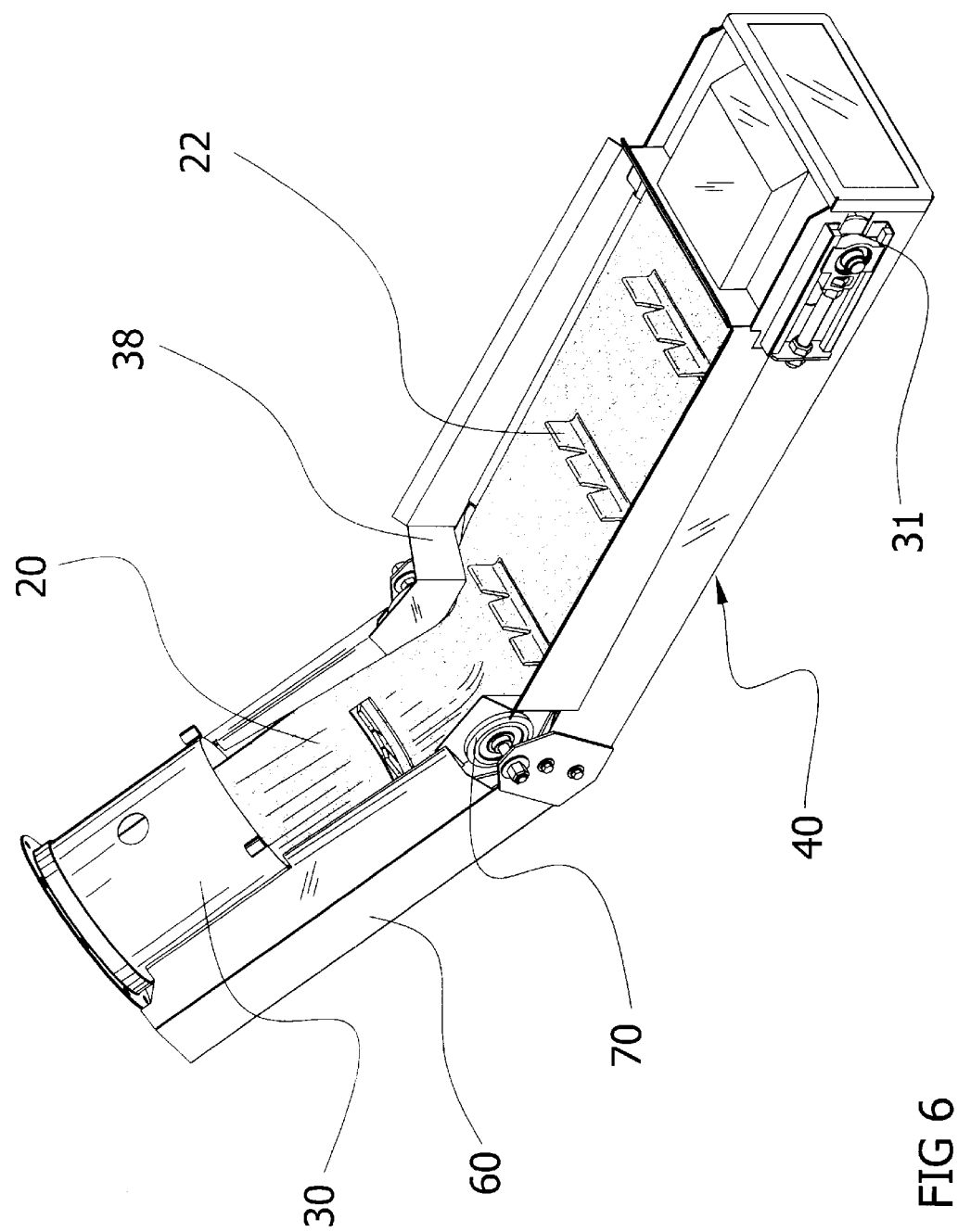
FIG. 6 is magnified upper perspective view of the intake structure.
Figure 7:
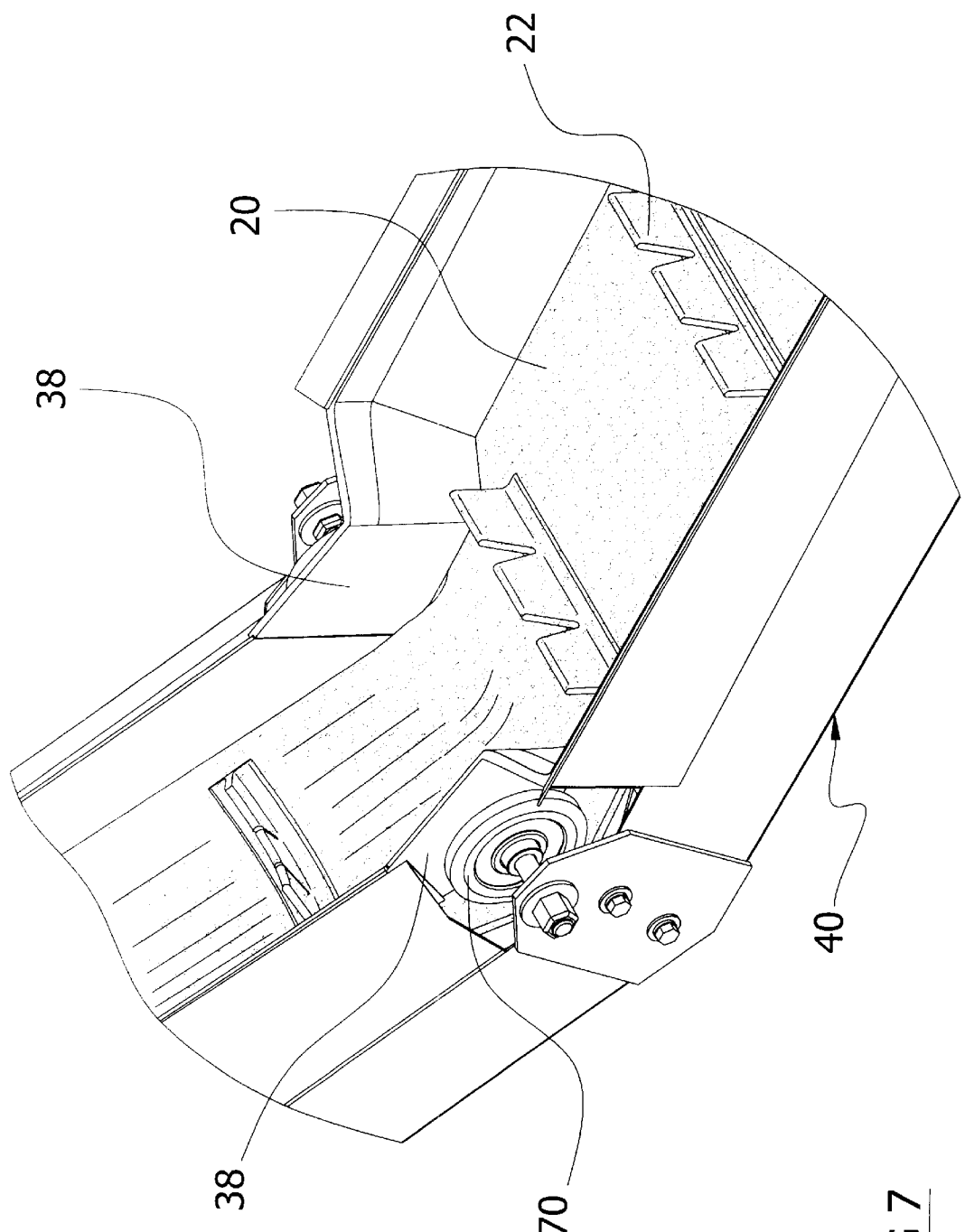
FIG. 7 is a magnified upper perspective view of the transition portion from the flat structure to the curvilinear structure for the endless belt.

As shown in FIGS. 2 and 6 of the drawings, a first roller 31 is attached to the distal end portion of the receiver support structure 40 for rotatably supporting one end of the endless belt 20. A second roller 33 is attached to the discharge end 36 of the tube 30 for rotatably supporting the endless belt 20 opposite of the first roller 31. The endless belt 20 passes from the flat surface of the receiver support structure 40 through the lumen 32 of the tube 30 about the second roller 33 along the outside of the tube 30 and about the first roller 31 back into the lumen 32 of the tube 30 transporting material from the intake end of the tube 30 out through the discharge end 36.

Figure 3:
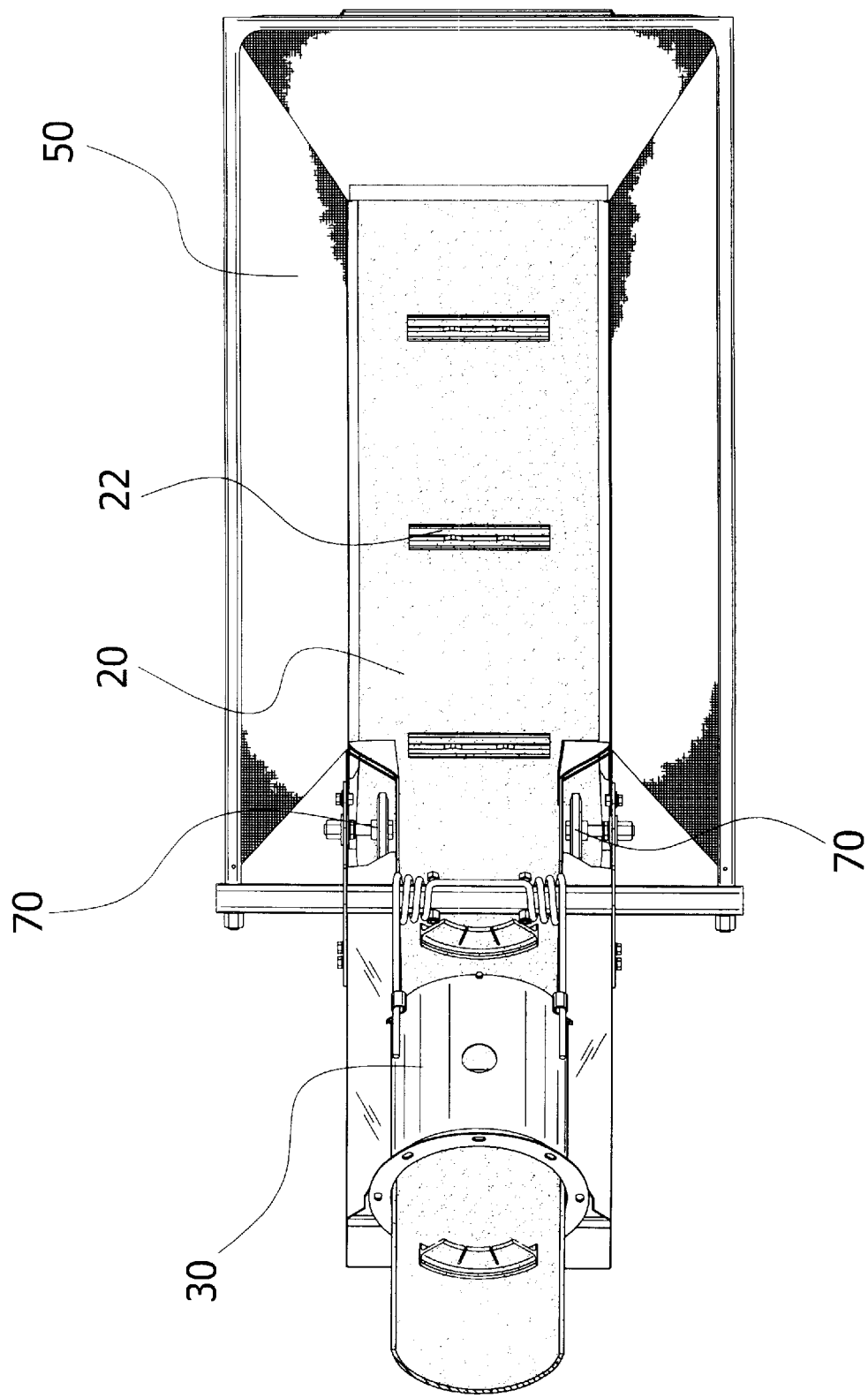
FIG. 3 is a magnified top view of the intake structure.
Figure 4:
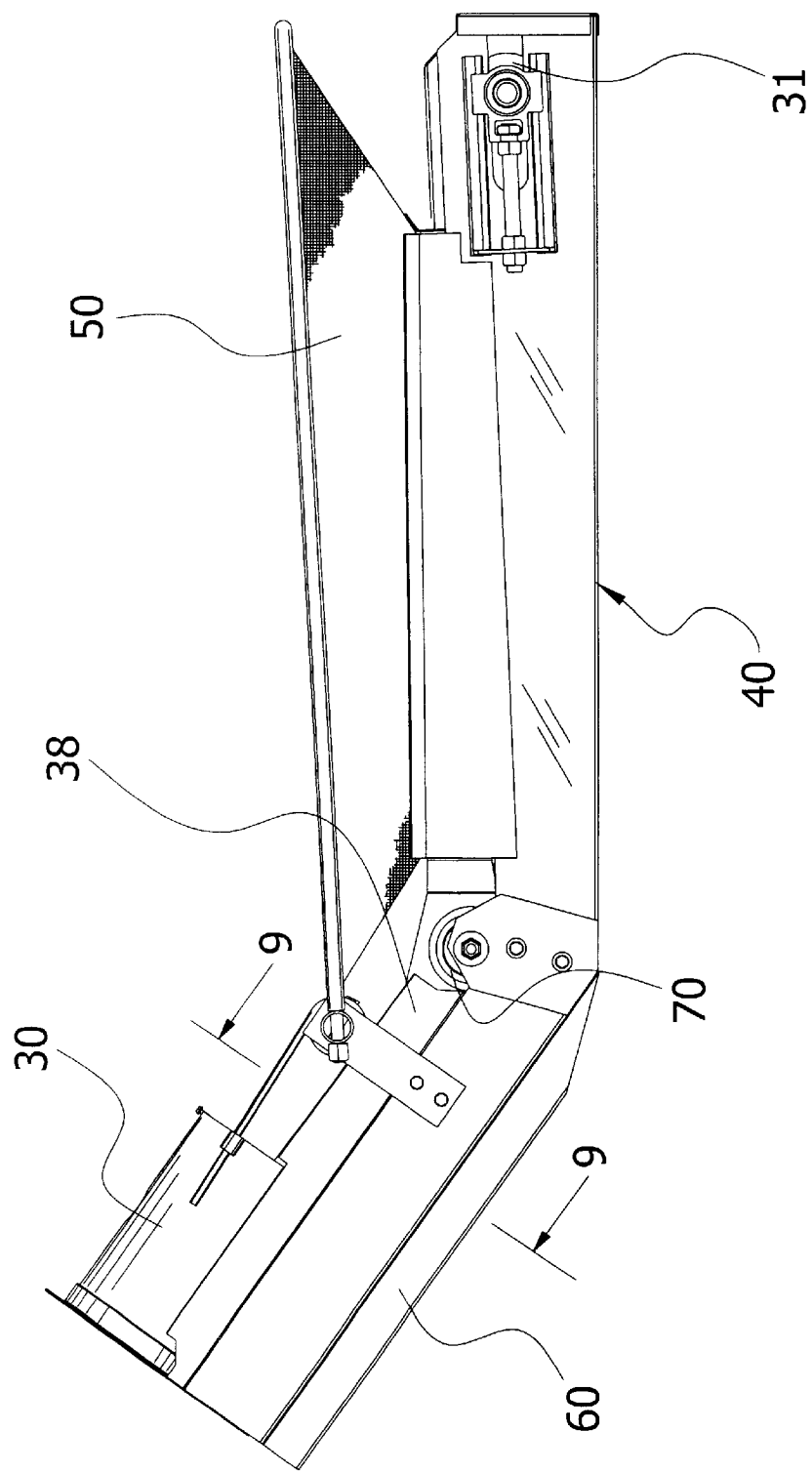
FIG. 4 is a magnified side view of the intake structure.
Figure 5:
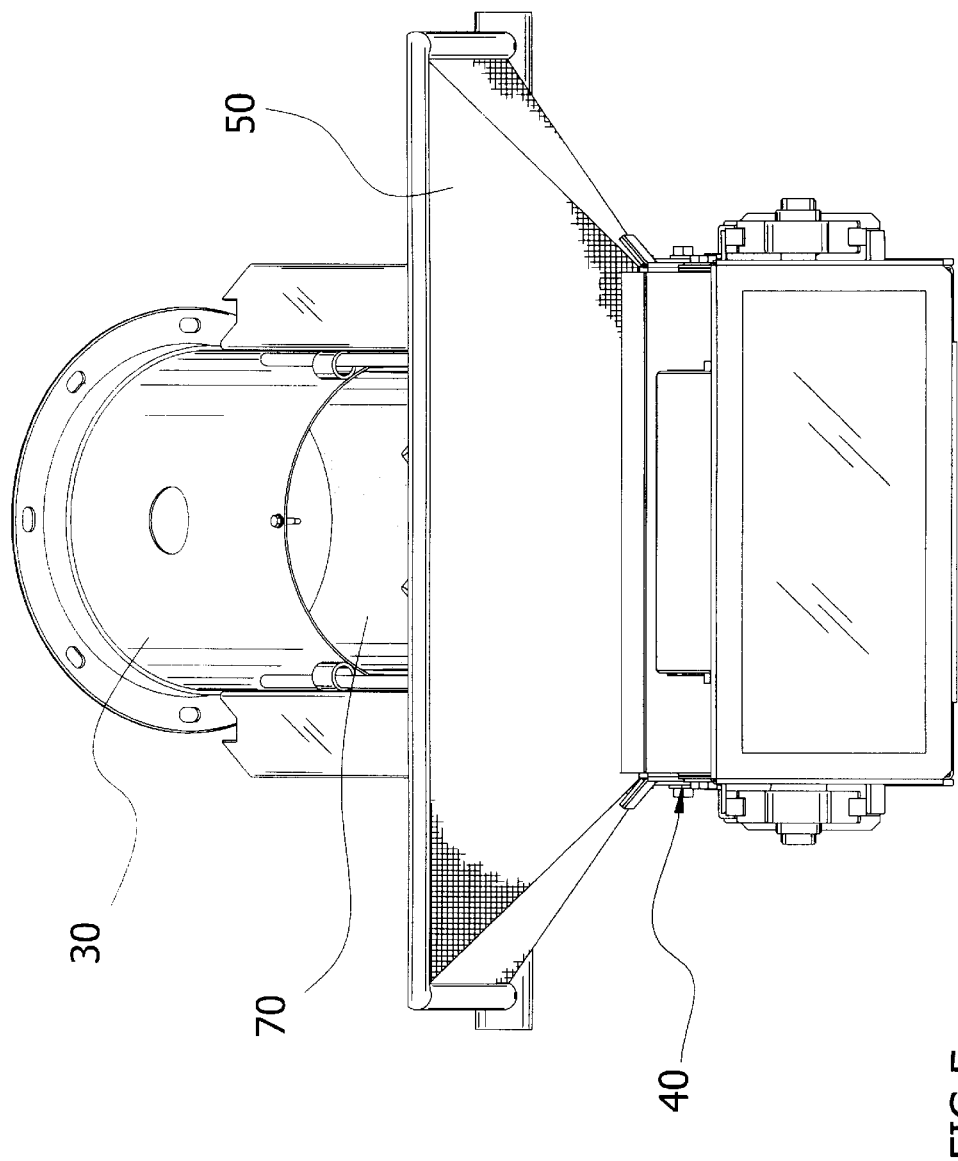
FIG. 5 is a magnified front view of the intake structure.

As shown in FIGS. 2 and 3 of the drawings, a pair of opposing guide plates 38 extend from the receiver support structure 40 inwardly at an angle to divert material inwardly during the transition from the flat state of the endless belt 20 to the curved state within the tube 30. The guide plates 38 prevent material from extending about the outer edges of the endless belt 20 during the transition thereof.

Figure 10:
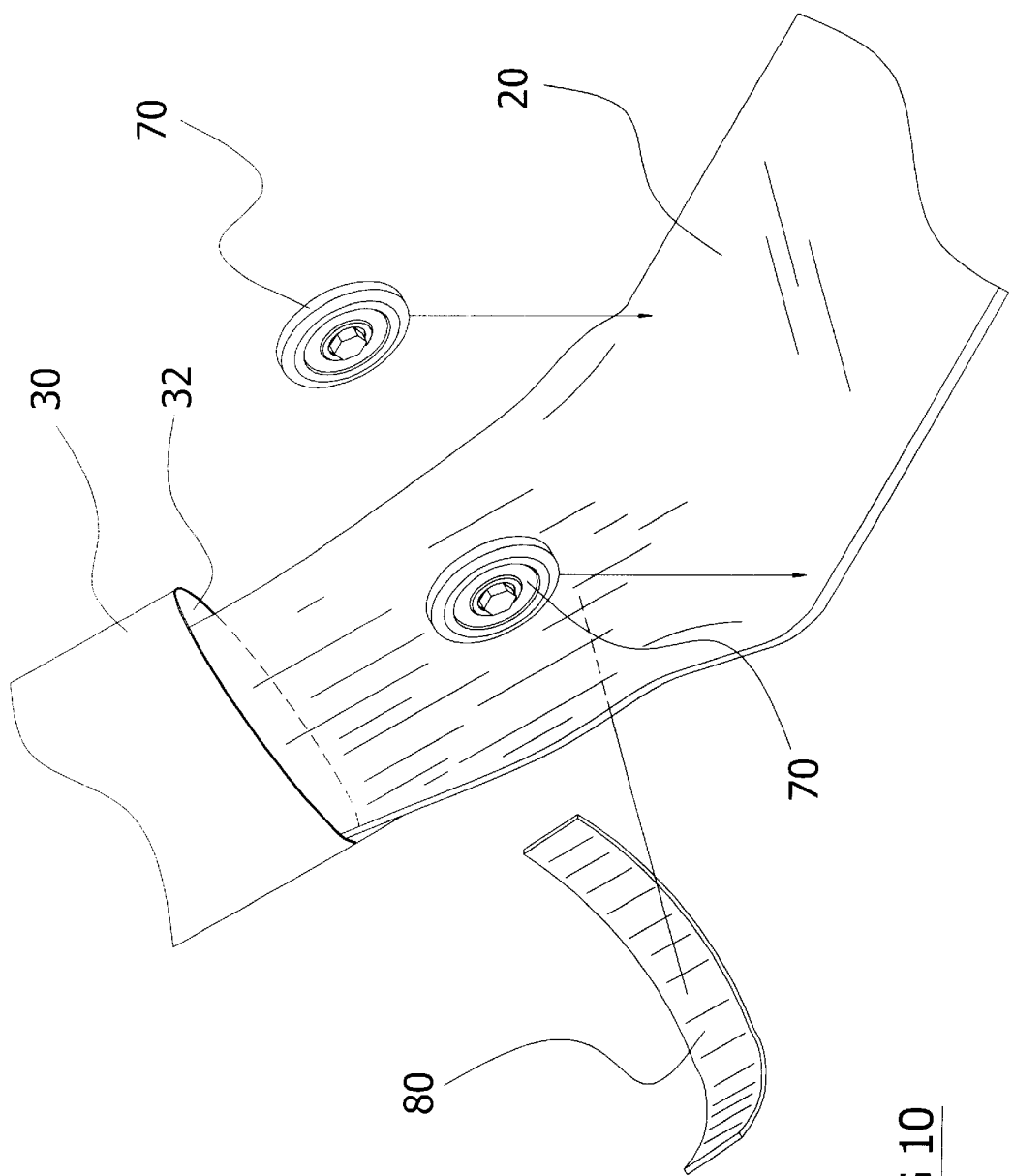
FIG. 10 is an exploded upper perspective view of the transition portion illustrating the guide rollers in relationship to the endless belt.
Figure 12:
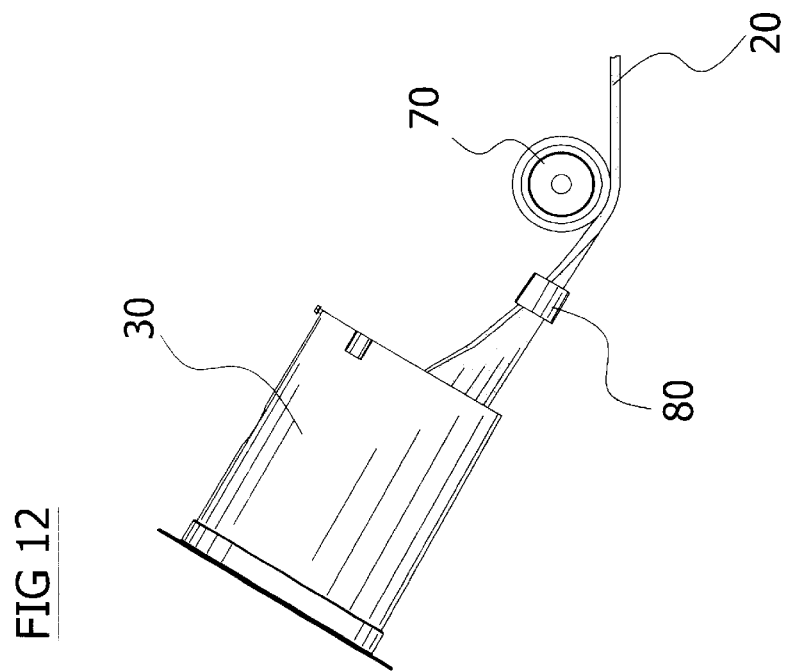
FIG. 12 is a side view of the endless belt being guided from a flat structure into a curvilinear structure within the tube by a transition support member.
Figure 11:
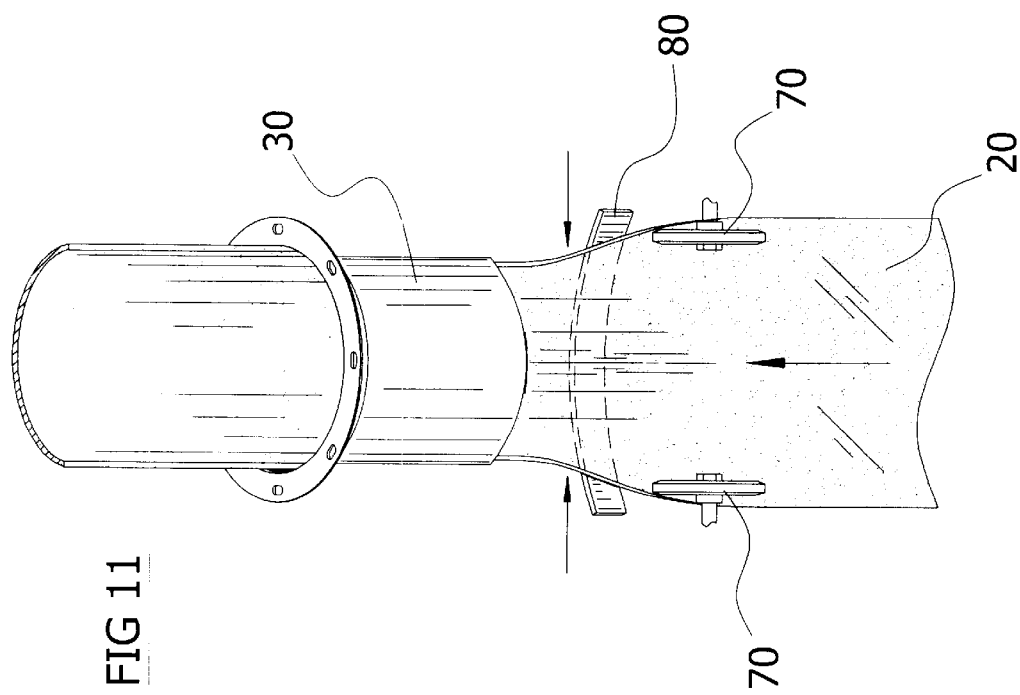
FIG. 11 is a top view of the endless belt being guided from a flat structure into a curvilinear structure within the tube by a transition support member.
Figure 16:
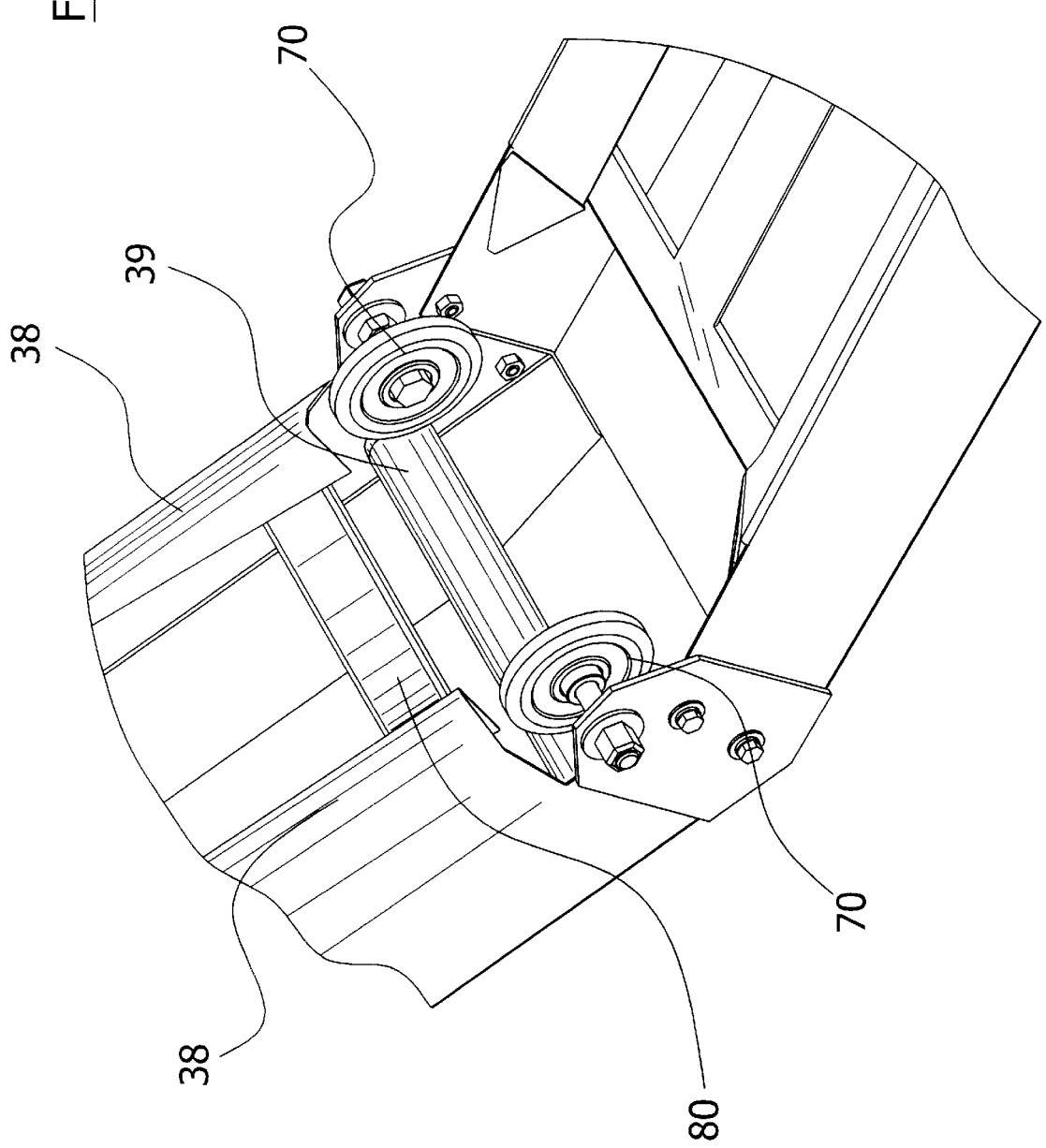
FIG. 16 is a magnified upper perspective view of the transition portion of the present invention without the endless belt.

As best illustrated in FIGS. 10 through 12 of the drawings, a transition support member 80 is attached to the receiver support structure 40 beneath the endless belt 20 for manipulating the endless belt 20 into a curved state. As the endless belt 20 passes over the curved transition support member 80, the endless belt 20 is curved to the desired curvature prior to entering the lumen 32 of the tube 30.

As further shown in FIGS. 2, 3, 6, 7, 10, 11 and 12 of the drawings, a pair of guide rollers 70 are rotatably secured on the outside of the guide plates 38 to the receiver support structure 40 for engaging the outer portions of the upper surface of the endless belt 20 prior to engaging the transition support member 80. As best shown in FIG. 12 of the drawings, the guide rollers 70 allow the endless belt 20 to remain flat upon the receiver support structure 40 while allowing the belt 20 to become curved opposite of the guide rollers 70 by the transition support member 80.

As shown in FIG. 8 of the drawings, a return roller 39 is preferably rotatably secured within the receiver support structure 40 for guiding the return portion of the endless belt 20 to the first roller 31. It can be appreciated that various other structures may be utilized in place of the return roller 39 that are capable of accomplishing a similar function.

Figure 9:
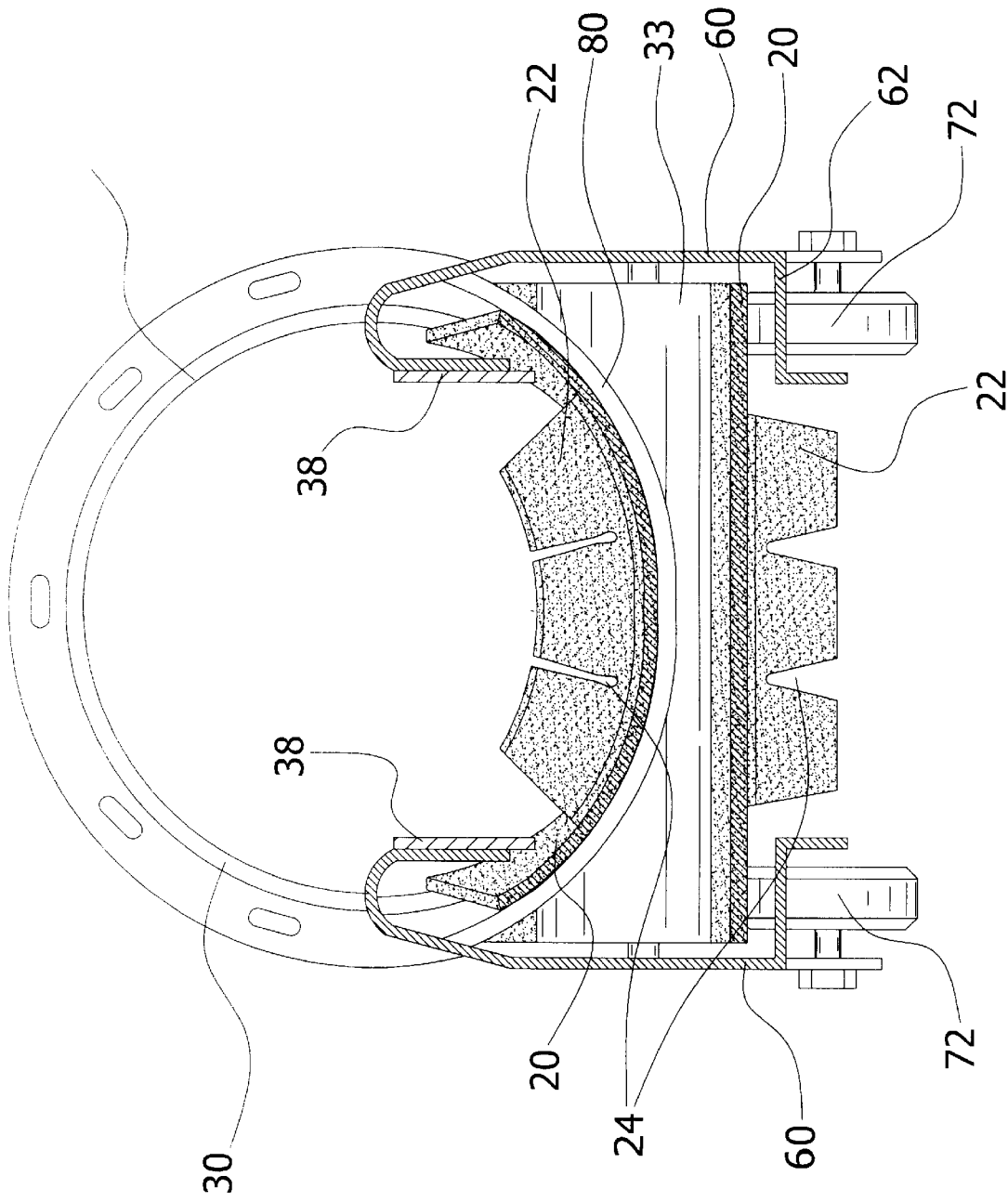
FIG. 9 is a cross sectional view taken along line 9—9 of FIG. 4.

A pair of tension rollers 72 are preferably rotatably attached to the discharge end 36 of the tube 30 adjacent the second roller 33 as best illustrated in FIGS. 9 and 14 of the drawings. The tension rollers 72 allow for reduced tension within the delivery portion of the endless belt 20 while maintaining a desired tension within the return portion of the endless belt 20.

The discharge end 36 of the tube 30 preferably either transitions outwardly or with the side portions terminated for allowing the endless belt 20 to return to a flat state prior to engaging the second roller 33. A foam member 90 is formed within the discharge end 36 of the tube 30 for transitioning the endless belt 20 into a flat state. The foam member 90 preferably is resilient and allows for movement of the endless belt 20. The foam member 90 further preferably includes a pair of opposing guide slots 90 for receiving the outer portions of the endless belt 20.

As shown in FIG. 1 of the drawings, a motor 12 is attached to the tube 30 or the support frame 16. The motor 12 is mechanically connected to the second roller 33 by a drive belt 14 or other well-known drive assembly for rotating the endless belt 20 through the lumen 32 of the tube 30. It can be appreciated that various other devices may be utilized to drive the endless belt 20 such as the PTO shaft of a tractor vehicle or similar devices.

The endless belt 20 is an elongate structure forming an endless loop. The endless belt 20 may include a connection portion for allowing the removal and installation of the endless belt 20 within the tube 30 and receiver support structure 40. The endless belt 20 forms a loop about the lower portion of the tube 30 passing through the lower portion of the lumen 32 of the tube 30 and adjacent the lower outer surface of the tube 30.

The endless belt 20 has a substantially flat portion that supports and receives the particulate material. The endless belt 20 includes an outer surface and an inner surface, wherein the inner surface is engaged by the rollers 31, 33. The outer surface of the endless belt 20 supports the particulate material being transferred.

A plurality of paddle members 22 are attached to the outer surface of the endless belt 20. Each of the paddle members 22 preferably extends orthogonally from the endless belt 20, however it can be appreciated that the paddle members 22 may have various angles and designs with respect to the endless belt 20. The paddle members 22 may be formed within the endless belt 20 or attached by any conventional means. The paddle members 22 may be comprised of any well-known material as can be appreciated.

The paddle members 22 are spaced upon the outer surface of the endless belt 20 as best shown in FIG. 14 of the drawings. The paddle members 22 may have any desired spacing between them depending upon the type of particulate material being transported.

As best shown in FIG. 9 of the drawings, each of the paddle members 22 includes one or more cutouts 24 extending from the upper edge of the paddle members 22 to the endless belt 20. The cutouts 24 preferably have a tapered design when the endless belt 20 is in a flat state as shown in FIG. 9 of the drawings. The cutouts 24 preferably have a V-shaped structure wherein the portion of the cutouts 24 adjacent to the base of the endless belt 20 is curved to prevent debris from colleting between the paddle members 22. As shown in FIG. 9 of the drawings, the portion of the cutouts 24 near the base of the endless belt 20 forms a broader opening than the remaining portion of the cutouts 24 when positioned within the lumen 32 of the tube 30 when the endless belt 20 is within the curved state. When the endless belt 20 is positioned within the lumen 32 of the tube 30 the endless belt 20 is curved inwardly thereby partially closing the openings created by the cutouts 24 and creating a plurality of substantially solid paddle members 22 as shown in FIG. 9 of the drawings. The cutouts 24 allow the endless belt 20 to conform to either a flat structure or an angled structure since the paddle members 22 do not rigidly support the endless belt 20 traverse to the longitudinal axis of the endless belt 20. The paddle members 22 engage and support the particulate material as it is transported through the lumen 32 of the tube 30 from the intake end to the discharge end 36 of the tube 30.

As shown in FIG. 9 of the drawings, the cutouts 24 preferably have a V-shape with a rounded narrow portion however various other shaped cutouts 24 may be utilized depending upon the cross sectional shape of the tube 30 and the particulate material to be transported. The cutouts 24 preferably extend from the upper end of the paddle members 22 to the outer surface of the endless belt 20, however it is possible for the cutouts 24 not to fully extend to the outer surface of the endless belt 20.

As shown in FIG. 1 of the drawings, a wind skirt 60 is preferably attached to the lower outer portion of the tube 30. The wind skirt 60 guides the return portion of the endless belt 20 to prevent excessive movement of the endless belt 20 during operation. As shown in FIG. 9 of the drawings, the wind skirt 60 includes a pair of side slots 62 that slidably receive the outer portions of the endless belt 20 for preventing significant side movements and for supporting the return portion of the endless belt 20 during and after operation.

The wind skirt 60 has a lower elongate opening for allowing debris to be removed from the endless belt 20. At least one support plate is attached from opposing sides of the lower elongate opening of the wind skirt 60 for preventing the endless belt 20 from leaving the return path of the wind skirt 60. The support plate includes opposing angled edges for preventing damage to the paddle members 22 during operation. During and after operations, the distal ends of the paddle members 22 engage the support plate thereby maintaining the endless belt 20 within the side slots 62 of the wind skirt 60.

In use, the motor 12 is actuated to rotate the endless belt 20 about the tube 30 and the receiver support structure 40. The delivery portion of the endless belt 20 first receives a volume of material within the receiver support structure 40 when in a flat state. The endless belt 20 thereafter passes from the receiver support structure 40 and then into the lumen 32 of the tube 30 from the intake end to the discharge end 36 carrying the particulate material at an upward angle. The paddle members 22 prevent the particulate material from falling downwardly during operation of the present invention. The cutouts 24 of the paddle members 22 are significantly closed upon the delivery portion of the endless belt 20 because of the curved walls of the tube 30. The outer portions of the endless belt 20 engage the outer portions of the particulate material and prevent the particulate material from building up upon the inner side portions of the lumen 32 of the tube 30 which can reduce the efficiency and operation of the present invention as shown in FIG. 9 of the drawings. The outer portions of the endless belt 20 preferably extend upwardly within the lumen 32 of the tube 30 for engaging a significant portion of particulate material. As shown in FIG. 9 of the drawings, the outer portions of the endless belt 20 may extend higher than the highest portion of the paddle members 22. As the particulate material is transported through the lumen 32 of the tube 30 it eventually reaches the discharge end 36 where the endless belt 20 is positioned about the second roller 33. As the endless belt 20 passes about the second roller 33, the particulate material is allowed to be released from the endless belt 20 through the discharge end 36 onto the desired location such as a grain bin. As the endless belt 20 engages the second roller 33, it is flattened thereby opening the cutouts 24. The return portion of the endless belt 20 thereafter enters the wind skirt 60 where the outer portions of the endless belt 20 are slidably received and guided within the side slots 62. The distal ends of the paddle members 22 engage the support plate thereby preventing the endless belt 20 from falling out of the wind skirt 60 after operation of the present invention. The endless belt 20 thereafter moves about the first roller 31 and receives new particulate material at the intake end of the tube 30. The process continues until the user terminates the operation of the endless belt 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:
1. A conveyor system, comprising:
    a tube having a lumen, an intake end and a discharge end, wherein said lumen has a lower portion and an upper portion;
    a receiver support structure attached to said intake end having a generally horizontal structure, wherein said tube is angled upwardly from said receiver support structure;
    a first roller rotatably attached within said receiver support structure;
    a second roller rotatably attached within said discharge end of said tube
    an endless belt having an outer surface and an inner surface positioned about said tube and said receiver support structure along with said first roller and said second roller, wherein a delivery portion of said endless belt is positioned within said lumen and wherein a return portion of said endless belt is positioned outside said lumen;
    a drive assembly mechanically connected to said endless belt for rotating said endless belt;

a plurality of paddle members attached to said outer surface of said endless belt; and a cutout between each of said plurality of paddle members, wherein said at least one cutout has a V-shape with a rounded narrow portion extending to said endless belt for preventing collection of debris between each of said plurality of paddle members.

2. A conveyor system, comprising:

a tube having a lumen, an intake end and a discharge end, wherein said lumen has a lower portion and an upper portion;

a receiver support structure attached to said intake end having a generally horizontal structure, wherein said tube is angled upwardly from said receiver support structure;

a first roller rotatably attached within said receiver support structure;

a second roller rotatably attached within said discharge end of said tube an endless belt having an outer surface and an inner surface positioned about said tube and said receiver support structure along with said first roller and said second roller, wherein a delivery portion of said endless belt is positioned within said lumen and wherein a return portion of said endless belt is positioned outside said lumen;

a foam member having a pair of guide slots within said discharge end for receiving said endless belt;

a drive assembly mechanically connected to said endless belt for rotating said endless belt;

a plurality of paddle members attached to said outer surface of said endless belt; and a cutout between each of said plurality of paddle members.

3. The conveyor system of claim 2, wherein said lower portion of said lumen is curved.

4. The conveyor system of claim 2, wherein said lower portion of said lumen is U-shaped.

5. The conveyor system of claim 2, including a pair of tension rollers rotatably attached to said tube adjacent said second roller.

6. The conveyor system of claim 2, including a pair of guide rollers rotatably attached to said receiver support structure adjacent said intake end of said tube for maintaining said endless belt within a flat state when positioned upon said receiver support structure.

7. The conveyor system of claim 6, including a transition support member having a curved structure attached to said receiver support structure adjacent said intake end of said tube for forming said endless belt into a curved state after said pair of guide rollers.

8. The conveyor system of claim 7, including a return roller rotatably attached within said receiver support structure for engaging said inner surface of said endless belt upon said return portion at an intersection of said receiver support structure and said tube.

9. The conveyor system of claim 2, wherein said endless belt is in a flat state when positioned upon said receiver support structure and within a curved state when positioned within said lumen of said tube.

10. The conveyor system of claim 2, wherein said at least one cutout has a V-shape with a rounded narrow portion extending to said endless belt for preventing collection of debris between each of said plurality of paddle members.

11. A conveyor system, comprising:

a tube having a lumen, an intake end and a discharge end, wherein said lumen has a lower portion and an upper portion;

a receiver support structure attached to said intake end having a generally horizontal structure, wherein said tube is angled upwardly from said receiver support structure;

a first roller rotatably attached within said receiver support structure;

a second roller rotatably attached within said discharge end of said tube an endless belt having an outer surface and an inner surface positioned about said tube and said receiver support structure along with said first roller and said second roller, wherein a delivery portion of said endless belt is positioned within said lumen and wherein a return portion of said endless belt is positioned outside said lumen;

a drive assembly mechanically connected to said endless belt for rotating said endless belt;

a plurality of paddle members attached to said outer surface of said endless belt;

a cutout between each of said plurality of paddle members; and a wind skirt attached to said tube for slidably receiving said return portion.

12. The conveyor system of claim 11, wherein said lower portion of said lumen is curved.

13. The conveyor system of claim 11, wherein said lower portion of said lumen is U-shaped.

14. The conveyor system of claim 11, including a foam member having a pair of guide slots within said discharge end for receiving said endless belt.

15. The conveyor system of claim 11, including a pair of tension rollers rotatably attached to said tube adjacent said second roller.

16. The conveyor system of claim 11, including a pair of guide rollers rotatably attached to said receiver support structure adjacent said intake end of said tube for maintaining said endless belt within a flat state when positioned upon said receiver support structure.

17. The conveyor system of claim 16, including a transition support member having a curved structure attached to said receiver support structure adjacent said intake end of said tube for forming said endless belt into a curved state after said pair of guide rollers.

18. The conveyor system of claim 17, including a return roller rotatably attached within said receiver support structure for engaging said inner surface of said endless belt upon said return portion at an intersection of said receiver support structure and said tube.

19. The conveyor system of claim 11, wherein said endless belt is in a flat state when positioned upon said receiver support structure and within a curved state when positioned within said lumen of said tube.

20. The conveyor system of claim 11, wherein said at least one cutout has a V-shape with a rounded narrow portion extending to said endless belt for preventing collection of debris between each of said plurality of paddle members.

* * * * *